United States Patent
Ruiz-Velasco et al.

(10) Patent No.: US 9,654,721 B2
(45) Date of Patent: May 16, 2017

(54) SYSTEM AND METHOD FOR PROVIDING PERSONAL CONTENT RECOMMENDATIONS

(75) Inventors: Enrique Ruiz-Velasco, Flower Mound, TX (US); Laxmi M. Patel, Irving, TX (US); Japan A. Mehta, Irving, TX (US); Senthil K. Raghavan, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1248 days.

(21) Appl. No.: 11/775,643

(22) Filed: Jul. 10, 2007

(65) Prior Publication Data

US 2009/0019488 A1    Jan. 15, 2009

(51) Int. Cl.
| G06F 3/00 | (2006.01) |
| G06F 13/00 | (2006.01) |
| H04N 5/445 | (2011.01) |
| G06F 3/0482 | (2013.01) |
| G06F 3/0489 | (2013.01) |
| H04N 7/173 | (2011.01) |
| H04N 21/258 | (2011.01) |
| H04N 21/442 | (2011.01) |
| H04N 21/45 | (2011.01) |
| H04N 21/462 | (2011.01) |
| H04N 21/466 | (2011.01) |
| H04N 21/482 | (2011.01) |
| H04N 21/658 | (2011.01) |

(52) U.S. Cl.
CPC ....... *H04N 5/44543* (2013.01); *G06F 3/0482* (2013.01); *G06F 3/04892* (2013.01); *H04N 7/17318* (2013.01); *H04N 21/25891* (2013.01); *H04N 21/44222* (2013.01); *H04N 21/4532* (2013.01); *H04N 21/4622* (2013.01); *H04N 21/4668* (2013.01); *H04N 21/4826* (2013.01); *H04N 21/6582* (2013.01)

(58) Field of Classification Search
USPC ......................................................... 725/46
See application file for complete search history.

(56) References Cited

U.S. PATENT DOCUMENTS

| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |

(Continued)

*Primary Examiner* — Jonathan V Lewis

(57) ABSTRACT

A system and method for providing personal content recommendations comprising a receiver to receive and collect one or more user commands at one or more modules, a processor to generate, at the one or more modules, one or more personalized recommendations based on the one or more user commands, and a transmitter to transmit the one or more personalized recommendations to be displayed at a display device in response to receiving one or more user inputs to display the one or more personalized recommendations.

24 Claims, 6 Drawing Sheets

(56) References Cited

U.S. PATENT DOCUMENTS

| | | | |
|---|---|---|---|
| 5,515,173 A | 5/1996 | Mankovitz et al. | |
| 5,532,732 A | 7/1996 | Yuen et al. | |
| 5,532,754 A | 7/1996 | Young et al. | |
| 5,541,738 A | 7/1996 | Mankovitz | |
| 5,550,576 A | 8/1996 | Klosterman | |
| 5,553,123 A | 9/1996 | Chan et al. | |
| 5,559,550 A | 9/1996 | Mankovitz | |
| 5,600,711 A | 2/1997 | Yuen | |
| 5,619,274 A | 4/1997 | Roop et al. | |
| 5,640,484 A | 6/1997 | Mankovitz | |
| 5,684,525 A | 11/1997 | Klosterman | |
| 5,701,383 A | 12/1997 | Russo et al. | |
| 5,706,145 A | 1/1998 | Hindman et al. | |
| 5,727,060 A | 3/1998 | Young | |
| 5,734,786 A | 3/1998 | Mankovitz | |
| 5,790,198 A | 8/1998 | Roop et al. | |
| 5,801,787 A | 9/1998 | Schein et al. | |
| 5,808,608 A | 9/1998 | Young et al. | |
| 5,809,204 A | 9/1998 | Young et al. | |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,655,963 B1* | 12/2003 | Horvitz | G06Q 30/02 434/236 |
| 6,668,133 B2 | 12/2003 | Yuen et al. | |
| 6,687,906 B1 | 2/2004 | Yuen et al. | |
| 6,704,931 B1* | 3/2004 | Schaffer et al. | 725/46 |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,774,926 B1* | 8/2004 | Ellis et al. | 348/14.01 |
| 6,799,326 B2 | 9/2004 | Boylan et al. | |
| 6,799,327 B1 | 9/2004 | Reynolds et al. | |
| 6,850,693 B2 | 2/2005 | Young et al. | |
| 6,859,799 B1 | 2/2005 | Yuen | |
| 7,039,935 B2 | 5/2006 | Knudson et al. | |
| 7,065,709 B2* | 6/2006 | Ellis | H04H 60/31 348/E7.063 |
| 7,069,576 B1 | 6/2006 | Knudson et al. | |
| 7,085,747 B2* | 8/2006 | Schaffer | H04N 7/163 348/E7.061 |
| 7,412,202 B2* | 8/2008 | Gutta | H04H 60/65 348/E7.061 |
| 7,487,529 B1 | 2/2009 | Orlick | |
| 7,644,427 B1* | 1/2010 | Horvitz | H04H 60/37 725/13 |
| 7,653,761 B2* | 1/2010 | Juster | H04N 21/4825 386/291 |
| 2001/0023401 A1* | 9/2001 | Weishut et al. | 705/1 |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2002/0194585 A1* | 12/2002 | Connelly | 725/9 |
| 2002/0199194 A1* | 12/2002 | Ali | 725/46 |
| 2003/0005445 A1 | 1/2003 | Schein et al. | |
| 2003/0056219 A1 | 3/2003 | Reichardt et al. | |
| 2003/0084450 A1* | 5/2003 | Thurston et al. | 725/46 |
| 2003/0093790 A1* | 5/2003 | Logan | G06F 17/30265 725/38 |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0121058 A1* | 6/2003 | Dimitrova et al. | 725/134 |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2003/0226144 A1* | 12/2003 | Thurston et al. | 725/39 |
| 2004/0003403 A1* | 1/2004 | Marsh | 725/53 |
| 2004/0008972 A1* | 1/2004 | Haken | 386/83 |
| 2004/0010806 A1 | 1/2004 | Yuen et al. | |
| 2004/0032486 A1* | 2/2004 | Shusman | 348/14.09 |
| 2004/0045025 A1 | 3/2004 | Ward et al. | |
| 2004/0049788 A1* | 3/2004 | Mori et al. | 725/58 |
| 2004/0107437 A1 | 6/2004 | Reichardt et al. | |
| 2004/0168189 A1 | 8/2004 | Reynolds et al. | |
| 2004/0194138 A1 | 9/2004 | Boylan et al. | |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0216936 A1 | 9/2005 | Knudson et al. | |
| 2005/0251824 A1 | 11/2005 | Thomas et al. | |
| 2006/0020962 A1* | 1/2006 | Stark et al. | 725/32 |
| 2006/0020973 A1* | 1/2006 | Hannum et al. | 725/46 |
| 2006/0156336 A1 | 7/2006 | Knudson et al. | |
| 2006/0174277 A1* | 8/2006 | Sezan et al. | 725/46 |
| 2006/0212894 A1 | 9/2006 | Knudson et al. | |
| 2006/0277574 A1 | 12/2006 | Schein et al. | |
| 2006/0288366 A1 | 12/2006 | Boylan et al. | |

(56) References Cited

U.S. PATENT DOCUMENTS

| | | | |
|---|---|---|---|
| 2007/0016926 A1 | 1/2007 | Ward et al. | |
| 2007/0033613 A1 | 2/2007 | Ward et al. | |
| 2007/0039023 A1* | 2/2007 | Kataoka | 725/46 |
| 2007/0050811 A1* | 3/2007 | Moriwaki et al. | 725/37 |
| 2007/0107010 A1 | 5/2007 | Jolna et al. | |
| 2007/0136753 A1* | 6/2007 | Bovenschulte et al. | 725/46 |
| 2007/0186241 A1* | 8/2007 | Sugimoto et al. | 725/46 |
| 2007/0186243 A1* | 8/2007 | Pettit et al. | 725/46 |
| 2007/0199025 A1* | 8/2007 | Angiolillo et al. | 725/47 |
| 2008/0168502 A1* | 7/2008 | Trauth | 725/46 |
| 2008/0256579 A1* | 10/2008 | Verhaegh et al. | 725/46 |
| 2008/0295132 A1* | 11/2008 | Icho et al. | 725/46 |
| 2008/0301737 A1* | 12/2008 | Hjelmeland Almas et al. | 725/61 |
| 2008/0307461 A1* | 12/2008 | Tanikawa | 725/53 |
| 2010/0031162 A1* | 2/2010 | Wiser | G06Q 30/0255 715/747 |
| 2015/0106451 A1* | 4/2015 | Boulter | G06F 17/30761 709/204 |

\* cited by examiner

SYSTEM AND METHOD FOR PROVIDING PERSONAL CONTENT RECOMMENDATIONS

BACKGROUND INFORMATION

Televisions are popular with consumers. Because of advances in recent technology, television-watching has evolved into a multimedia experience. For example, consumers may now watch TV in high-definition on a large flat-screen with stereo surround sound in the comfort of their homes. To add to this comfort, electronic on-screen program guides have enabled viewers to find and watch desired programs without bulky paper-bound guides. These electronic program guides (EPGs) allow viewers to see what TV programs are playing, or scheduled, on all the offered channels. As a result, television-watching experience has become much more convenient and pleasurable for viewers. However, most EPGs are limited to displaying shows based on channel and chronology (e.g., what each particular channel is currently playing and/or playing in the near future).

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Exemplary embodiments may provide personal content recommendations for TV programming. That is, exemplary embodiments may, among other things, list TV programs (e.g., via an EPG) that a viewer will likely enjoy based on the viewer's personal viewing history.

Figure 1:
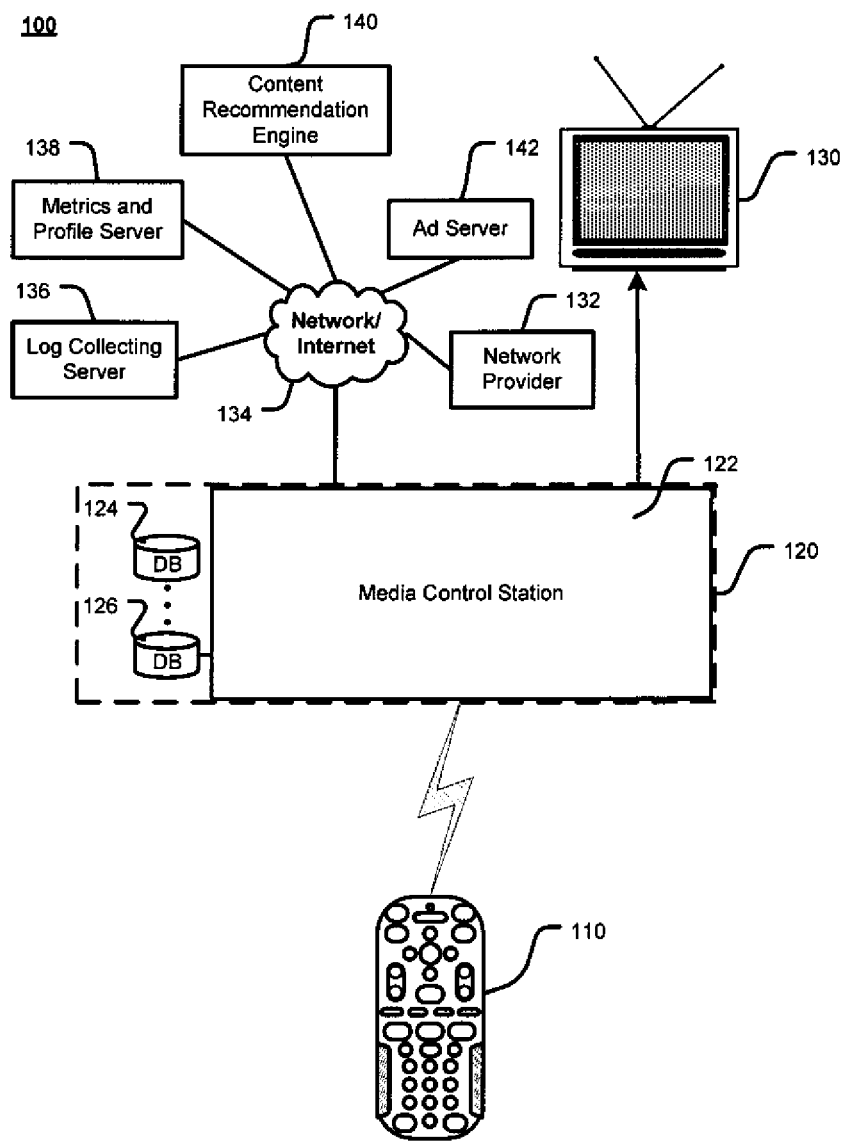
FIG. 1 depicts a block diagram of a system architecture, according to an exemplary embodiment.

FIG. 1 depicts a block diagram of a system architecture, according to an exemplary embodiment. The system 100 may comprise a subscriber side and a vendor side. The subscriber side of the system 100 may comprise a remote control device 110, a media box 120, and a display device 130. The display device 130 may be a TV, monitor, or other device capable of displaying media signals. Media box 120 may include a media control station 122 and one or more databases 124, 126. The media control station 122 may include a receiver to receive one or more commands/signals from the remote control device 110, receive one or more media signals (e.g., streaming media, television programs) from one or more network providers (e.g., TV network providers 132) via a network/internet 134 (e.g., cable, satellite), and an output to provide media signals to display at the display device 130. The vendor side of the system 100 may comprise a Log Collecting Server 136, a Metrics and Profile Server 138, a Content Recommendation Engine 140, and an Ad Server 142 connected to the one or more network providers 132 and the media control station 122 via the network/internet 134. It will be appreciated that not all components of the system 100 may be illustrated in FIG. 1. Other variations and components may also be provided, such as a Content Information Server (e.g., from which content/information may be fetched), a viewer interface, additional inputs/outputs, etc.

The remote control device 110 may transmit and/or receive signals to/from the media box 120. Signal transmission by the remote control device 110 may include a variety of wireless signaling pathways, such as infrared, Bluetooth™, local area wireless network (e.g., 802.11 based protocols), and/or other similar signaling applications for communicating between the remote control device 110 and the media box 120 or other similar devices. Other various embodiments may also be provided.

It should be appreciated by one of ordinary skill in the art that the remote control device 110 may come in a variety of shapes, sizes, textures, and functionalities with an assortment of buttons and/or labels. Additionally, the remote control device 110 may use various technologies (e.g., wired or wireless technologies) to communicate with external devices. Furthermore, the remote control device 110 may include various playback features, alphanumeric entries/buttons, and other similar functions. It should also be appreciated that other devices having alphanumeric and/or similar remote control capabilities may be used as remote control devices as well. These may include desktop computers, laptops, game controllers, mobile communication devices, such as personal digital assistants (PDAs), mobile phones, smart phones, as well as other devices that may transmit and/or receive signals to/from the media box 120.

Databases 124, 126 may store relevant information received from one or more network providers 132 and/or the servers 136, 138, 140, 142. Exemplary database information may include network provider information, TV program channel numbers, TV program channel names, program listings, program schedules for each of the programs, future and past programming information, ratings, viewer preferences, advertisement categories, advertisers, advertised product/service, and/or other information provided by a viewer or TV network provider 132 or storage source (e.g., pre-recorded TV programs/movies). Although shown as two separate databases, it should be appreciated that the contents of these databases may be combined into fewer or greater numbers of databases and may be stored on one or more data storage systems and/or servers. Furthermore, the databases 124, 126 may be local, remote, or a combination thereof to the media box 120. Additionally, the databases 124, 126 may also store relevant information for personalized subscriber services. These may include user/viewer channel preferences, preferred TV programs/channels, preferred TV viewing times, and other preferred or customized information. Such information may be useful in providing additional customizations for enhanced TV-viewing experience. Other variations may also be provided.

Log Collecting Server 136 may include one or more processors (not shown) for recording and storing data and/or information from one or more viewers through the media box 120. The data and/or information may be stored and indexed in one or more databases (not shown) by the one or more processors of the Log Collecting Server 136. In this example, the stored data and/or information may include, but is not limited to, a viewer's viewing habits and/or preferences, e.g., preferred TV programs/channels, consistency in viewing various TV programs/channels, time of day these are viewed, duration of viewing, frequency of channel-changing from or to various programs/channels, types of channels/programs viewed, etc. In another exemplary embodiment, the stored data and/or information may also include paid programming (e.g., Video on Demand and/or Pay-per-view), shows that are recorded using a personal video recorder (PVR) or other similar device (e.g., a digital video recorder (DVR), or other media (e.g., Internet videos, music, etc.).

In one embodiment, the Log Collecting Server 136 may utilize processor logic to identify the desired data and/or information to be recorded and stored. In another embodiment, the Log Collecting Server 136 may record and store the data and/or information based on a viewer's manual input of habits and/or preferences. In yet another embodiment, the Log Collecting Server 136 may include additional processing logic to sort and index the one or more recorded and stored data/information.

Storing and indexing the data/information may further allow the processing logic to cross-reference the various data/information for forming new categories or personal customizations. For example, in one embodiment, this may include complex viewing patterns/habits, such as how a viewer searches for programs to view (e.g., use of channel scanning, EPG, or search function). In another embodiment, this may include identifying commonalities in programs/channels viewed, such as type, genre, channel, or programs created or performed by a particular entity (e.g., a particular actor/actress, director, producer, sports team, etc.). In yet another embodiment, this may include frequency of recording programs/channels or use of PVR/DVR (Personal Video Recorder/Digital Video Recorder) features. In yet another embodiment, further processing may be utilized to determine when the programs/channels relating to these categories are viewed at various times of the day or week. Other various embodiments may also be provided.

Metrics and Profile Server 138 may include one or more processors (not shown) for storing and retrieving data and/or information from the Log Collecting Server 136. The data and/or information may be stored and indexed in one or more databases (not shown) by the one or more processors of the Metrics and Profile Server 136. In this example, the Metrics and Profile Server 138 may utilize processor logic to create, store, and retrieve viewer data and/or information based on profiles corresponding to various users/viewers. Here, a profile may include a collection of various user preferences. Since user preferences may be stored in profiles, similarities and differences between various users may be more readily discerned. Other various profile embodiments may also be utilized. In one embodiment, the Metrics and Profile Server 138 may interact with the Log Collecting Server 136, the Content Recommendation Engine 140, and the Ad Server 142 to store, update, and disseminate viewer profiles. In another embodiment, the Metrics and Profile Server 138 may interact with other servers, such as marketing servers (not shown), to generate usage reports on the various profiles and profile types. In yet another embodiment, the Metrics and Profile Server 138 may further allow the processing logic to cross-reference the various data/information to compare various viewer profiles and form new categories based on various degrees of similarity. Other various embodiments may also be provided.

Content Recommendation Engine 140 may include one or more processors (not shown) for presenting data and/or information to one or more viewers through the media box 120. The data and/or information may be stored and indexed in one or more databases (not shown) by the one or more processors of the Content Recommendation Engine 136. In this example, the Content Recommendation Engine 140 may present a viewer with personal content recommendations based on the viewer's personal viewing history, which may be retrieved from data and/or information stored at the Log Collecting Server 136. These personal viewer recommendations may include a viewer's preferred TV programs/channels based on consistency in viewing various TV programs/channels, time of day these are viewed, duration of viewing, frequency of channel-changing from or to various programs/channels, types of channels/programs viewed, consumer popularity, etc. In another embodiment, a viewer's personal content recommendations may be based on the preferences, viewing history, habits of other users/profiles exhibiting similar patterns to the viewer. In this example, these profiles may be retrieved from the Metrics and Profile Server 138 and presented by the Content Recommendation Engine 140 to the viewer. Other various embodiments may also be provided.

Ad Server 142 may include one or more processors (not shown) for recording, storing, and presenting advertisement data and/or information from the one or more TV network providers 132. The data and/or information may be stored and indexed in one or more databases (not shown) by the one or more processors of the Ad Server 142. In this example, the stored advertisement data and/or information may include TV advertisements and corresponding advertisement data provided by TV network providers. In one embodiment, TV advertisements and corresponding advertisement data may be transmitted along with TV programming or guide information. As a result, the Ad Server 136 may utilize processor logic to identify the desired data and/or information to be recorded and stored. In another embodiment, the Ad Server 136 may include additional processing logic (e.g., an Ad Recommendation Engine) to sort and index the one or more recorded and stored TV advertisements by at least one of the following: category, advertiser, product, title, length of ad, initial broadcast time, ratings, popularity, closed-captioning information. In this example, the Ad Server 142 may transmit advertisement data and/or information that may have a strong relation or link to the personal content recommendations provided by the Content Recommendation Engine 140. As a result, the Ad Server 142 may index the advertisement information according to categories based on viewer preferences stored in the Log Collecting Server 136, the Metrics and Profile Server 138, or the Content Recommendation Engine 140 to maximize marketing potential. In yet another embodiment, storing and indexing may be achieved by parsing the advertisement data, which may typically be transmitted as searchable metadata. In addition to recording, storing, indexing and transmitting TV advertisements, the Ad Server 136 may also record and store other data and/or information. These may include a variety of streaming media, such as music files, and other similar media.

Although each of the Log Collecting Server 136, the Metrics and Profile Server 138, the Content Recommendation Engine 140, and the Ad Server 142 is depicted as one server, it should be appreciated that the contents of the each of these server may be combined into fewer or greater numbers of servers (or server-like devices, such as modules) and may be connected to one or more data storage systems. Furthermore, each of these servers may be local, remote, or a combination thereof to the media box 120. Other various embodiments may also be provided. In addition, it should be appreciated that while a telephone line is not depicted in any of the figures, one of ordinary skill in the art would recognize that telephone lines may be utilized for transmitting data and/or information between the various components of system 100. For example, a viewer who desires to pay to watch a particular show/movie may transmit his or her selection to the network provider 132 via a telephone line. Here, the network provider 132 may transmit the selected programming via satellite or other similar transmission. Other various embodiments may also be utilized to transmit such data.

By monitoring or tracking a viewers actions and TV-navigation history, recording the habits and preferences along the way, storing them, and/or indexing them into various categories and profiles, as discussed above, viewer recommendations for TV programming may be provided. Not only does this provide an effective and improved technique for navigating various programs/shows, it also provides users the ability to do so in an efficient manner. As a result, overall TV-watching experience may be further enhanced because viewers may spend less time navigating programs/shows and spend more time enjoying their preferred programs/shows. Moreover, providing personal content recommendations may maximize advertisement and marketing opportunities by linking advertisements with the preferences of viewers, which may not otherwise be provided by conventional EPGs or other navigation techniques. Accordingly, embodiments may expand the limited number of techniques for searching and navigating one or more shows/programs using various program guide menus and options.

Figure 2A:
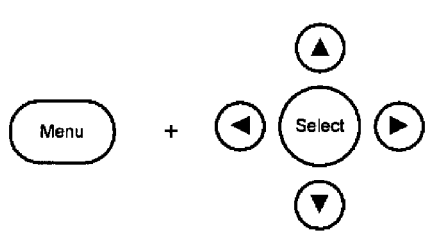
FIG. 2A depicts remote control keys for initiating and navigating a personal content recommendations menu, according to an exemplary embodiment.
Figure 2B:
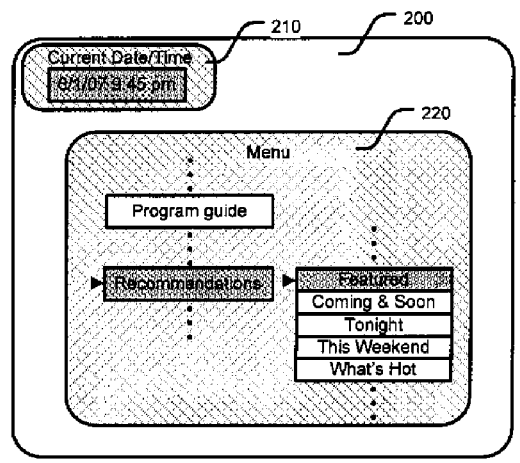
FIG. 2B-2C depict screenshots of a personal content recommendations menu, according to an exemplary embodiment.
Figure 2C:
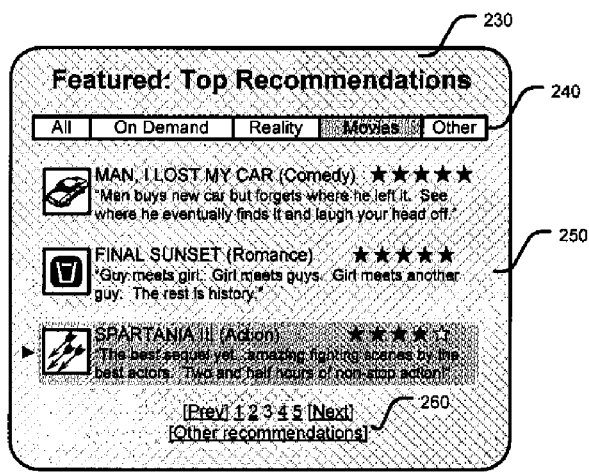

FIG. 2A depicts remote control keys for initiating and navigating a personal content recommendations menu, according to an exemplary embodiment. FIG. 2B-2C depict screenshots of a personal content recommendations menu, according to an exemplary embodiment. A user may initiate navigation of TV programs and/or TV program data by sending a user command from the remote control device 110 to the media box 120, specifically the media control station 122. Once the media box 120 receives and processes the user command, the media control station 122 may output, at the display device 130, an interactive menu for the user to specify the TV program and/or program data to view based on various navigation options.

In one embodiment, as depicted in FIG. 2A, a user may press a Menu button (or other similar button or buttons) on the remote control device 110 to send a user command to the media box 120. In response to receiving the user command, the media box 120 may provide a current date and time indicator 210 and an interactive menu 220 to be displayed at the display device 130. In one embodiment, for example, the interactive menu 220 may be displayed over a current screen or video broadcast 200, as depicted in FIG. 2B. In this example, the interactive menu 220 may provide a variety of navigation options for the user to select. In order to search for personal content recommendations, a user may use the remote control device 110 to navigate and select entries by using the arrows and Select button, as depicted in FIG. 2A. Referring back to FIG. 2B, the interactive menu 220 may provide a variety of navigation options, such as an advertisement index, a program guide option, a recommendations feature, and a variety of other viewing functions and/or customizable options. In this example, the user may use the arrow keys on the remote control device 110 to navigate and highlight the recommendations option to retrieve personal content recommendations based on the user's viewing preferences. Here, the user may use the remote control device 110 to further navigate the recommendations. For example, in one embodiment, the recommendations may be indexed in several categories. These may include shows/programs that are (1) currently playing, (2) will be playing shortly, (3) will be playing tonight, (4) will be playing this weekend, and (5) popular. Other various categories and indexing options may also be provided, e.g., preferred channels, etc.

For a show/program that is currently playing, the user may select the currently playing option and be prompted with a recommendations menu 230 listing various personalized recommendations for the user to select from, as depicted in FIG. 2C. In one embodiment, the recommendations menu 230 may include additional sorting features or categories 240 to further navigate the personalized recommendations. For example, the user may preview all the recommended movies from the body 250 of the recommendations menu 230, which may list the recommended movies that match the user's personal viewing profile/preferences. Here, the user may have a history of enjoying action, comedies, and romantic movies. As a result, the recommended movies, as depicted in FIG. 2C, may include these types of programming. In one embodiment, a brief caption (e.g., a title, a graphic, a summary, genre/type, a review, or a star rating) may be included with each recommendation. In one embodiment, the brief caption may be visual, audible, or a combination thereof.

The number of personalized recommendations at the recommendations menu 230 may vary. As depicted in FIG. 2C, three recommendations with captions 250 may be displayed at one time. In order for a user to preview of the other recommendations, the user may link to other pages of the recommendations menu 230 by selecting the addition navigation options 260. Here, the user may move to the next page or previous page of personalized recommendations by selecting "[Prev]", "[Next]", or any one of the page numbers. Other various embodiments may also be provided.

It should be appreciated by one of ordinary skill in the art that the recommendations menu 230 shown in FIG. 2C may be customized and further personalized. For example, one user may have all the recommendations listed on a single menu page. Other users may elect not to include a navigation bar 240 at the top of the recommendations menu 230, but rather on the side or bottom or not at all. Other various customizable features may include color, size, shape, layout, and navigational options. It should be appreciated that these customized features may also be stored at the Log Collecting Server 136 to further process and develop user profiles at the Metrics and Profile Server 138 for enhancing viewer personalization, including viewing recommendations. Furthermore, the information available to the user, as listed in the recommendations menu 230, may not be limited to what is presented in the screen 230. For instance, it should be appreciated that many of the information components in screen 230 may be underlined or highlighted to indicate that the user may interact with the screen 230 (e.g., by selecting via the remote control device 110) to pull up additional screens/menus for more detail information on that particular information component/subset. Scroll bars (horizontal and vertical) may also be provided to assist user navigation. In another embodiment, recommendations may also be tagged or flagged by a user to mark priority (e.g., priority of display)

to further enhance personal customization. Other ways to access and display additional information may also be provided.

For a show/program that will be played in the future, the user may not yet have access to play the show, but if the user has a personal video recorder (PVR), also called a digital video recorder (DVR), or other similar device, the show may be selected and set for future recording and/or viewing. In one embodiment, if the user does not have a PVR or DVR, the user may set future program/show to prompt the user to switch over to the selected future program/show at the appropriate time. In another embodiment, even though the show/program may not yet be viewed, the user may select the recommended future show to view information about the program as long as the information is provided by a network provider 132 or other data source. Other various features may also be provided, such as advance programming purchases (e.g., Pay-per-view).

Figure 3A:
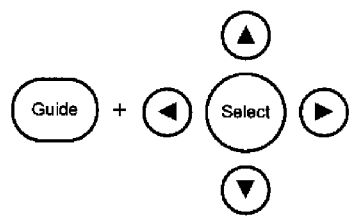
FIG. 3A depicts remote control keys for initiating an interactive program guide and a personal content recommendations menu, according to an exemplary embodiment.

FIG. 3A depicts remote control keys for initiating an interactive program guide and a personal content recommendations menu, according to an exemplary embodiment. FIGS. 3B-3E depict screenshots of a personal content recommendations menu, according to an exemplary embodiment. As discussed above, a user may initiate navigation of TV programs and/or TV program data by sending a user command from the remote control device 110 to the media box 120, e.g., to the media control station 122. In this example, however, once the media box 120 receives and processes the user command, the media control station 122 may output, at the display device 130, an interactive program guide (IPG) including a variety of user options for the user to specify the TV program and/or program data to view.

Figure 3B:
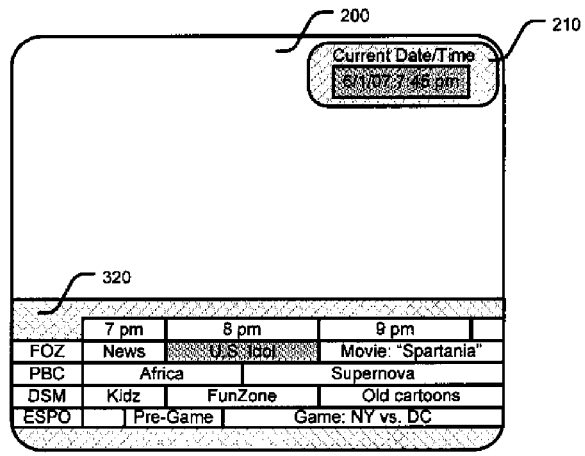
FIGS. 3B-3E depict screenshots of a personal content recommendations menu, according to an exemplary embodiment.

As depicted in FIG. 3A, a user may press a Guide button (or other similar button or buttons) on the remote control device 110 to send a user command to the media box 120. In response to receiving the user command, the media box 120 may provide a current date and time indicator 210 and an interactive program guide (IPG) 320 to be displayed at the display device 130. In one embodiment, for example, the interactive program guide (IPG) 320 may be displayed over a current screen or video broadcast 200, as depicted in FIG. 3B. In this example, the interactive program guide (PG) 320 may provide a variety of programs/shows for the user to navigate, select, and view. In order to search for TV programs and/or program data, a user may use the remote control device 110 to navigate and select entries. For example, the user may navigate the interactive program guide 320 by using the arrows and Select button, as depicted in FIG. 3A.

Figure 3C:
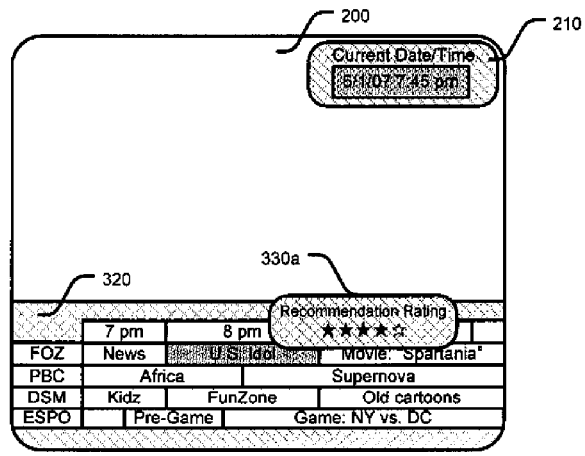

In one embodiment, as depicted in FIG. 3C, a user may interact with the program guide 320 and select from a variety of shows/programs from a variety of channels from a variety of TV network providers. In this example, the user may want to find out which shows from among the various shows, programs, movies, sports events, etc., playing at that time are personalized recommendations. The user may scroll over each entry using the arrows of remote control device 110. For example, the user may select "U.S. Idol" from among various shows, programs, movies, sports events, etc. By manipulating the arrows on the remote control device 110 and by pressing the Select button (or other similar buttons) or by waiting for a predetermined amount of time (e.g., 1-2 seconds), the remote control device 110 may send a program data command to the media box 120. Once a receiver at the media box 120 receives this program data command, a recommendations menu 330 for the selected program (in this case, U.S. Idol) may be displayed over the video broadcast 200, e.g., via picture-in-picture (PIP). Here, the recommendations menu 330 may provide a star rating (or other similar image or indicator) indicative of its degree of recommendation. As a result, the user may discover whether a show is recommended or not (or the degree of recommendation) before selecting to watch the show. This may be particularly advantageous because it facilitates navigation by allowing the user to readily see the personalized recommendations.

Figure 3D:
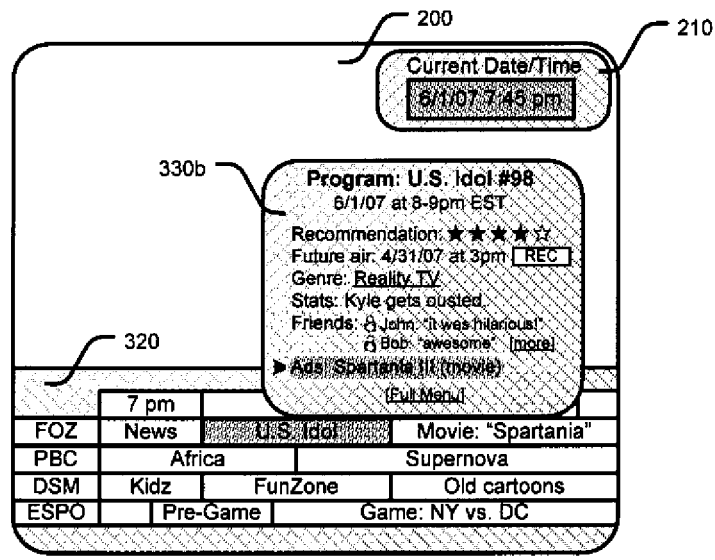

In another embodiment, the recommendations menu 330 may provide more than just a star rating. As depicted in FIG. 3D, the recommendations menu 330 may display a variety of information for the user to view. The information may include, but are not limited to, the title of the show or program, when the show or program was first aired, what type or genre of TV programming it is, the producers of the show or program, the actors/actresses involved in the show or program, ratings, awards, statistics (or summary of the show or program), similar programs, and other program information. The recommendation menu 330 in may also be a customized to provide other additional information as well. For example, the user may set the recommendations menu 330 to display the title of the show/program, the first airing of the show/program, the personalized recommended star-ratings of the show/episode, the next time the show/program is schedule to air again (and the corresponding PVR/DVR record setting feature), the genre, the stats or summary of the show/program, reviews/comments by third party sources (e.g., newspapers, other subscribers, etc.), and a list of advertisements. As a result, in the event the user or the Content Recommendation Engine 140 knows that these are the features frequently used, a customized recommendations menu 330 having each of these components for the user to view in a single customized menu 330 may increase efficiency and enhance the user's overall TV-watching experience. In one embodiment, the customized recommendations menu 330 may also include an option to enlarge the page 330 (or window), for example, so as to incorporate more components that may not have fit in the smaller page or to include more detail regarding the components already shown in the small page. Other various customizations may also be provided.

Figure 3E:
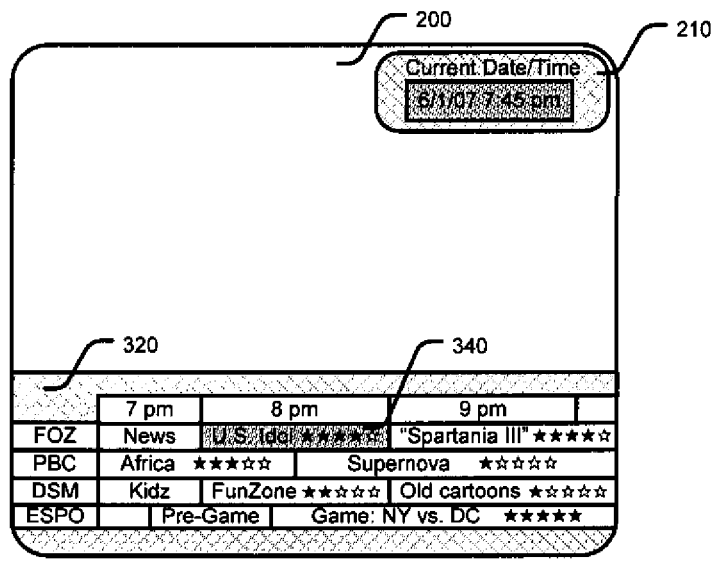

In yet another embodiment, the interactive program guide (IPG) 320 may be pre-labeled with ratings (e.g., star-ratings) indicative of its degree of recommendation, as depicted in FIG. 3E. Here, a recommendations menu 330a of FIG. 3C or customized recommendations menu 330b of FIG. 3D may not be necessary since the user may readily discover directly from the IPG 320 which shows/programs are recommended and to what degree they are recommended, e.g., by a star rating. In yet another embodiment, the interactive program guide (IPG) 320 may be color-coded to distinguish shows/programs that are recommended. When more than two colors are used, varying degrees of recommendation may also be provided. For example, red may indicate high recommendation whereas orange and yellow are lesser in degree of recommendation. Additionally, in this example, the user may be provided a color legend to discern what degree of recommendation each color represents. In another embodiment, the user may customize the colors for ease of use. It should be appreciated that while embodiments are illustrated with star-ratings, other various rating mechanisms may also be provided, such as color indicators, percentage indicators (%), etc. Other various customizations may also be provided so greater flexibility and ease of use.

It should be appreciated that any of the menus/indicators 210, 220, 330a, 330b, 340 may be of varying sizes, shapes, colors, fonts, or other stylistic features, and may be positioned at various locations on the video screen 200. In one embodiment, for example, interactive program guide 320 may take up the entire screen 200. In another embodiment, the IPG 320 may be smaller, overlayed, or put in the corner of the video broadcast 200, e.g. picture-in-picture (PIP). Likewise, the recommendations menus 330*a*, 330*b*, recommendation indicators 340 and other menus/indicators may also be personalized or customized to the preferences of different users. Other various embodiments may also be provided.

Additionally, it should be appreciated that while the personalized recommendations features above are described in reference to shows/programs that are currently being aired or will be aired in the future, one of ordinary skill in the art would recognize that the functions and features of the program information menu may apply similarly to previously aired programming as well. For example, a recommendations menu 330 may be accessed for previously aired programs as well. Although the recommendations menu of previously-aired shows may not necessarily include rebroadcast information or rebroadcast information readily available for viewing for the user, it should be appreciated that information, such as recommendation ratings, etc., may also be included. Furthermore, personalized recommendations features may also be utilized with non-time specific programs/shows (e.g., Video on Demand, Pay-per-View, YouTube videos, etc.). In this example, personalized recommendations may be provided based on information, such as recommendation ratings, preference matching, etc. Other variations may also be provided.

It should be appreciated that many of the information components in any of the menus/screenshots may be underlined or highlightable to indicate that the user may interact with the menus/screenshots (e.g., by highlighting and selecting via the remote control device 110) to pull up additional screens/menus for more detail information on that particular information component/subset. For example, the user may highlight a selection and pull up another corresponding screen/menu or extend the current screen to read on. Other various embodiments may also be considered.

There are a variety of ways for system 100 to determine a user's viewing habits and/or preferences. In one embodiment, a user may voluntarily input preferences to the system 100. In this example, the system 100, through its media box 120, may provide an interactive screen for the user after a show/program is completely viewed or more than fifty percent (50%) completed. In the interactive screen, the user may be asked to give feedback about that show/program. The feedback may include a rating, a comment, or other similar feedback, to indicate the user's preference on that show/program. Here, the user's voluntary input may generate an explicit rating to be weighted in the calculation of the user's preferences. In another embodiment, the interactive screen may be accessed without having watched a show/program. The user may simply input preferences about any previously-watched show or any personal preferences. Feedback entry may be accomplished via the remote control 110. Once the media box 120 receives the remote control entries corresponding to the user's preferences, the data may be stored at the media box 120 or transmitted to the Log Collecting Server 136, Metrics and Profile Server 138, and/or Content Recommendation Engine 140 for storage and processing. Although the interactive screen for feedback entry may be complex (so as to retrieve as much voluntary user input as possible), a simpler interactive screen may be much more efficient and more attractive to users.

Because a user may find it cumbersome to voluntarily enter feedback, the system 100, in another embodiment, for example, may utilize a knowledge discovery feature to retrieve a user's preferences by studying the user's viewing habits. The knowledge discovery feature may begin at the remote control device 110 where the user inputs various commands reflective of personal viewing preferences/habits. The media box 120 may log these commands as "raw" data for processing and "discovering" the various actions the user is performing. For example, the media box 120 may receive a command from the remote control 110 to change a channel or program to another. The media box 120 may log the change, the date and time the instructions were received/performed, the length and duration of the change, the name of the show/program change to and from, the type of show/program, whether any other options/commands were also received, and other information relating to a viewer's preferences and habits. This "raw" data may then be transmitted to the Log Collecting Server 136 for further storage and/or processing. The Log Collecting Server 136 may receive this data and learn that the user prefers watching particular shows/programs at a particular time of the day on a particular channel. This information may then be processed and stored as one or more user preferences at the Log Collecting Server 136. For example, the processing logic of the Log Collecting Server 136 may take this "raw" data (e.g., how long the user stays a particular channel without changing) and "discover" by inference the user's viewing preferences. In this example, the Log Collecting Server 136 may take the actions performed by the user and infer preferences. These actions may include, but not limited to, shows/programs/channels watched, shows/programs recorded, favorites added or tagged, shows/movies purchased, reminders set, queries searched, market place purchases, series recording priority, consistency in viewing various TV programs/channels, time of day these are viewed, duration of viewing, frequency of channel-changing from or to various programs/channels, types of channels/programs viewed, etc. As a result, the knowledge discovered may be used to generate an implicit rating for the user by utilizing a weighted combination of these actions.

In yet another embodiment, the voluntary input and knowledge discovery techniques may be used in combination. In this example, the explicit and implicit ratings for the user may be weighted accordingly to calculate the user's preferences. In one embodiment, in the event the user provides an explicit rating for a show/program that has already generated an implicit rating, the implicit rating may be replaced by the explicit rating. In another embodiment, the most recent rating—implicit or explicit—may trump. In yet another embodiment, the variance between implicit and explicit ratings for a particular show, for example, may be averaged over many users. This average may be used to correct the implicit rating for the same shows a user has not yet explicitly rated. Other various priority embodiments may also be provided.

It should be appreciated that while these rating techniques discussed above generally relate to the Media Box 120 and the Log Collecting Server 136, one of ordinary skill in the art would recognize that the other servers of the system 100 may be involved in generating preferences as well. For example, the Metrics and Profile Server 138 and the Content Recommendations Engine 140 may also provide, receive, and/or process the data from the media box 120 or other sources to generate user preferences.

It should also be appreciated that the knowledge discovery technique may initially request permission from users to retrieve, store, and process the user's viewing habits to generate preferences and ultimately provide personalized recommendations. This may be accomplished with a disclaimer or other similar method/technique.

Figure 4:
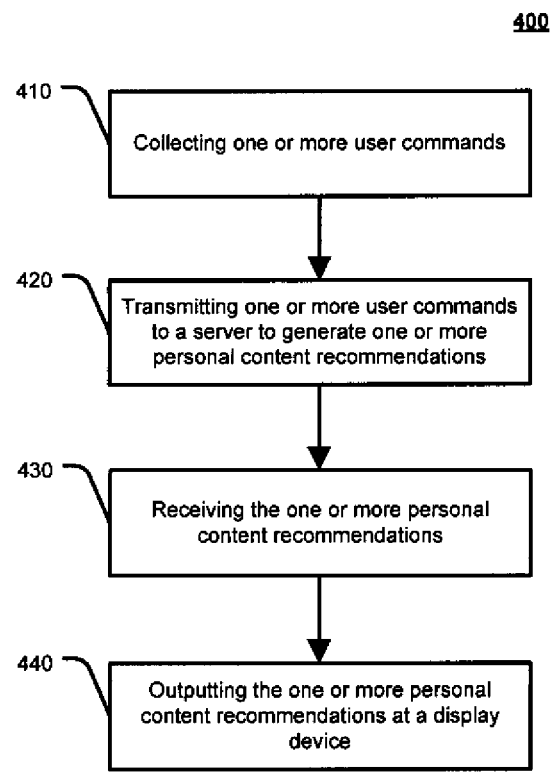
FIG. 4 depicts a flowchart of a method for providing personal content recommendations, according to an exemplary embodiment.

FIG. 4 depicts a flowchart, according to an exemplary embodiment. At block 410, one or more user commands, e.g., to select a program or perform a related action, may be collected from a user. At block 420, the one or more user commands may be transmitted to at least one server. In this example, the at least one server may generate one or more personalized recommendations based on the one or more user commands by a processor. At block 430, the one or more personalized recommendations may be received at a receiver. At block 440, the one or more personalized recommendations may be outputted by an output in response to receiving one or more user inputs from the user to display the one or more personalized recommendations at a display device.

Figure 5:
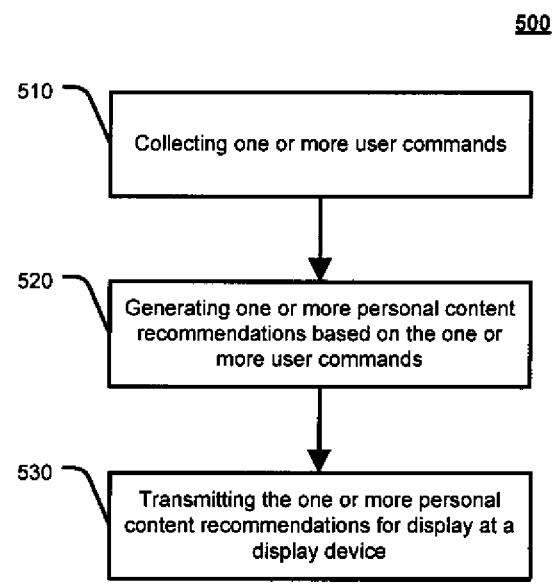
FIG. 5 depicts a flowchart of a method for providing personal content recommendations, according to an exemplary embodiment.

FIG. 5 depicts a flowchart, according to an exemplary embodiment. At block 510, one or more user commands from a media box 120. At block 420, one or more personalized recommendations may be generated based on the one or more user commands by a processor in at least one server. At block 530, the one or more personalized recommendations may be outputted at an output in response to receiving one or more user inputs from the user to display the one or more personalized recommendations at a display device.

There may be several models for generating recommendations. In one embodiment, Log Collecting Server 138 and Metrics and Profile Server 140 may take into consideration the profile of various users in a user-based collaborative filtering scheme. Here, generating the one or more personalized recommendations may include matching a profile of the user with one or more profiles of similar users within a community. As a result, a user may be matched with other similar users to generate recommendations using at least one of the following criteria: genre, actors, director, year of release, awards, description of the program/show/movie, etc. By using the profiles of other users (with their user preferences at hand), personal content recommendations may be generated efficiently based on their explicit and/or implicit preferences as users.

Another way to generate personalized recommendations for a user may include generating the one or more personalized recommendations including matching one or more programs selected by the user with one or more similar programs within a community (e.g., all users who subscribe to personalized recommendations). In one embodiment, this may include content-based matching, where matching is based on matching metadata content in the one or more programs with one or more similar programs. Here, the user's ratings of a show/program, for example, may be used to find similar items based on content and metadata of the show/program. The information used for matching (e.g., genre, actors, directors, year of release, awards, description of the program, movie, etc.) may be found in the content and/or searchable metadata of the show/program. Once a match is found, these shows/programs may be tagged, stored, and transmitted to the user as personal content recommendations.

In another embodiment, an item-based collaborative filtering scheme may be utilized under this framework to provide personal content recommendations. Here, the Log Collecting Server 136 or Metrics and Profile Server 138 may take into consideration the ratings of shows/programs by the user and the ratings of similar shows/programs rated by all users within a community. As a result, matching may be based on matching ratings provided by the user for the one or more programs with ratings provided by additional users for the one or more similar programs. In yet another embodiment, the matching may be based on matching relationships provided by a third party. This type of matching generates personal content recommendations by induced recommendations. For example, when a new show/program becomes available for viewing, the Content Recommendation Engine 140 may find out all existing related shows/programs. The Content Recommendation Engine 140 may further allow third parties, such as field experts or marketing experts, to chime in and adjust the related shows/programs. For instance, the movie "Spartania" may have a sequel, "Spartania II." As a result, the Content Recommendation Engine 140 may automatically recognize and register "Spartania II" as being a highly related movie. A field expert or marketing expert may also recognize that "Top Flight," "Ghengis," and "Secret Agent 711" are also related. As a result, they may induce the relationship into the system as well. As a result, when a user who has watched "Spartania" looks for personal content recommendations, the user may also be presented with at least these personalized movie recommendations. Therefore, under this scheme, the relationship between existing items may be improved by third parties who optimize matching relevance.

Personal content recommendations independent of a user's preferences or viewing habits may also be generated. For example, generating one or more personalized recommendations may be based on recommendations from at least one of a host service provider, a third party, and an external rating source (e.g., a community poll). For instance, a service provider may simply have a list of recommendations they have developed on their own, with business partners, or under other collaborations. In one embodiment, the recommendations may incorporate knowledge discovered about the user's preferences but may be completely independent as well. Another embodiment may include generating recommendations based on consumer popularity. Popularity information may be gathered from small community polls, from third party polling entities, other service providers, or a combination thereof. Other various embodiments may also be provided.

A hybrid model to dynamically combine each of the aforementioned models may also provide another way of providing a user personal content recommendations. For example, users are dynamic—one day, users may provide explicit preferences for some shows/programs, and on another day, users may rely on the system's 100 knowledge discovery to figure out recommendations. Additionally, some users may have lots of preferences and others may have little or no preferences. Therefore, a hybrid model that dynamically implements each of the models discussed above may yield and optimize personal content recommendations.

For example, the Content Recommendation Engine 140 (along with the other servers of the system 100) may have stored explicit and implicit preferences from a seasoned user (e.g., a user who has provided many explicit and implicit preferences over an extended period of time). As a result, personalized recommendations may be weighted and based on the models that best suited for the seasoned user. Here, the Engine 140 may weigh the user-based and content-based models more heavily than the independent-based models simply because the known preferences of the seasoned user are stronger. Alternatively, a new user, who may not have yet logged any preferences for the system 100, may benefit more from the independent-based models. As time goes by, however, the Engine 140 may detect more and more of the user's preference. Accordingly, the system 100 may continue to dynamically adjust itself and give proper weight to the various approaches so as to provide the user with the most relevant personalized recommendations. As a result, dynamically generating personal content recommendations from a combination of at least two of the approaches described above may provide an optimized solution for filtering and dissemination personal content recommendations to a user.

Embodiments may provide several advantages. For example, a variety of different types of programming may be incorporated into this method and system of providing personal content recommendations. The programming may not be limited to merely TV shows or programs, but may also apply to paid-for viewing, on demand programming, programming recorded by personal video recorders (PVRs), Internet videos/music, or other types of programming/media.

Another advantage may be the system's dynamic hybrid approach of processing and generating personalized recommendations based on a variety of models. This provides users with an intelligent system that enhances the quality of a user's TV-watching experience as well as provides more efficient, easy-to-use navigation.

Furthermore, generating personal content recommendations for various users within a household may be achieved dynamically as well. In one embodiment, each user of the household may have a separate login identification and/or password for the media box 120. In this example, each user of the household may have a separate user profile in the media box 120. Once the media box 120 receives instructions to access a user profile (e.g., via personal identification, password, or other manual or automatic detection), the media box 120 may also recall that user's personalized preferences and dynamically provide his or her personal content recommendations. This may be particular useful in households with many residents. In another embodiment, identification and passwords may not be necessary. Here, the media box 120 and servers 136, 138, 140, 142 may generate recommendation based on the day and time, the types of programs already being watched, or other similar category. For example, on weekdays from 3 P.M. to 6 P.M. and on Saturday mornings, a user in the household may prefer to watch programming for children, such as cartoons, etc. This may be indicative that user is a young child. Therefore, the Content Recommendations Engine 140 may provide recommendations based on this known information. In the same example, another user in the household may be watching programming at midnight. Because there is little data on the preferences of a user of this household that watches TV at this time, the media box and servers may simply begin to infer the user's preference based on what the user is currently watching. Perhaps the user has been searching for movies by navigating through several known movie channels. In this scenario, the servers of the system may quickly generate movie recommendations based on this acquired information. As a result, Advantages in business and marketing may also be apparent. For example, knowing a user's preferences may provide unique way of not only providing personalized recommendations for TV programming, but also for providing targeted advertisements. In this example, users who watch certain types of programming may be more inclined to fit a particular type of lifestyle as well. As a result, a user who frequently watches sports programming may enjoy a lifestyle of being physically active, driving sports cars, eating various foods, drinking beer, etc. Thus, providing advertisements in at least these exemplary categories may not only increase the user's viewing pleasure by providing advertisements that are tailored to the user's interests, but may also benefit the business of the advertiser. Accordingly, improved services that conventional systems and techniques simply have not contemplated may also be provided.

While the features and functionalities of the personal content recommendations are primarily discussed with respect to the embodiments above, it should be appreciated that the features and functionalities of one embodiment may be similarly applied to other embodiments. Furthermore, while the program information menus and pages above are described primarily in reference to programs/shows that are currently being aired or will be aired in the future on the interactive program guide (IPG) 320, it should be appreciated by one skilled in the art that the functions and features of the program information menu may apply similarly to previously-aired programming as well, where applicable. For example, even though a show/program may not yet be viewed, the user may open up a program information page for the future show to view information about the program as long as the information is provided by a network provider or other data source. Other variations may also be provided.

It should be appreciated by one skilled in the art that any device capable of transmitting alphanumeric commands may function as a remote control device for the purposes of the embodiments described above. For example, a mobile phone with SMS-capability may send an alphabetic channel-changing SMS to a media box 120, which may include a variety of alphabetical command readers to search/retrieve advertisements from an Server 136. Accordingly, desktops, laptops, and/or mobile communications devices may also serve to provide remote control functionalities. Other various embodiments may also be provided.

While the embodiments described above may be directed to a media box 120, specifically the media control station 122, or any of the Log Collecting Server 136, the Metrics and Profile Server 138, the Content Recommendation Engine 140, and the Ad Server 142, to process the personalized recommendation features discussed above, it should be appreciated to one of ordinary skill in the art that a remote control device 110, a display device 130, and/or other component may include processing capabilities to perform the features described above as well. Additionally, it should be appreciated that one or more of these devices and/or components may be combined (e.g., a TV and a network card) to perform the personalized recommendation features described above. Other variations may also be provided.

Furthermore, although the embodiments described above are directed toward television programs and advertisements, it may be readily appreciated that one or ordinary skill in the art may apply the features and functionalities discussed above to any video, audio, or web-based component, such as computers, communications devices, PVRs or DVRs, multimedia websites/servers, DVDs players, VCRs, CD players, MP3s players, etc. Other various embodiments may also be contemplated.

It should also be appreciated that recommendations while personal content recommendations are view from a display device 130 by a media box 120, personal content recommendations may by viewed from a variety of other devices as well. For example, recommendations may also be provided at desktops, laptops, and/or mobile communications devices. In another embodiment, user preferences may also be inputted from other devices as well. Other various embodiments may also be provided.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
  receiving, at a first receiver of a computing device, one or more user commands;
  transmitting, at a transmitter of the computing device, to at least one module, the one or more user commands to generate one or more personalized recommendations based on the one or more user commands, wherein generating the one or more personalized recommendations comprises taking into account the user's implicit preferences and matching one or more programs selected by a user with one or more similar programs selected by one or more other users within a community, wherein the community comprises users over multiple geographic localities who subscribe to a personalized recommendations feature, wherein the user's implicit preferences are quantified as an implicit rating for the user based on raw data and discovered data, and wherein the discovered data is determined based on raw data;
  receiving, at a second receiver of the computing device, the one or more personalized recommendations; and
  outputting, at a display device, the one or more personalized recommendations in an electronic program guide (EPG) in response to receiving one or more user inputs to display the one or more personalized recommendations to the user, the EPG listing programs chronologically and sequentially by channel, a first portion of the listed programs in the EPG comprising the one or more personalized recommendations along with the quantified implicit rating for the user for the one or more personalized recommendations and a second portion of the listed programs in the EPG comprising no personalized recommendations for the second portion of listed programs.

2. The method of claim 1, wherein generating the one or more personalized recommendations comprises matching a profile of the user with one or more profiles of similar users within the community.

3. The method of claim 1, wherein the matching is based on matching metadata content in the one or more programs with the one or more similar programs.

4. The method of claim 1, wherein the matching is based on matching ratings provided by the user for the one or more programs with ratings provided by additional users for the one or more similar programs.

5. The method of claim 1, wherein the matching is based on matching relationships provided by a third party.

6. The method of claim 1, wherein generating the one or more personalized recommendations is based on recommendations from at least one of a host service provider, a third party, and a community poll.

7. The method of claim 1, wherein generating the one or more personalized recommendations comprises matching based on at least one of a profile of the user with one or more profiles of similar users within the community and additional relationships provided by at least one of a host service provider, a third party, and a community poll.

8. The method of claim 1, wherein the one or more personalized recommendations comprise recommendations for at least one of broadcast programming, video on demand programming, per-per-view programming, advertisements, Internet video, Internet music, and merchandise.

9. The method of claim 1, further comprising tagging at least one or more of the personalized recommendations for personalized display customization.

10. A computer readable media comprising code to perform the acts of the method of claim 1.

11. The method of claim 1, wherein the user's implicit preferences comprise preferences inferred from a user's commands to change a channel or program to another, how long the user viewed the channel or program before changing, the date and time the change command was received or performed, the name of the program changed to or from, the type of program changed to or from, or the channel changed to or from.

12. The method of claim 1, wherein the quantified implicit rating for the user for the one or more personalized recommendations displayed in the EPG are displayed using a color or a percentage indicator, wherein the color or the percentage indicator represent a degree of personalized recommendation to the user.

13. A system, comprising:
  a first receiver to receive one or more user commands;
  a transmitter to transmit, to at least one module, the one or more user commands to generate one or more personalized recommendations based on the one or more user commands, wherein generating the one or more personalized recommendations comprises taking into account the user's implicit preferences and matching one or more programs selected by a user with one or more similar programs selected by one or more other users within a community, wherein the community comprises users over multiple geographic localities who subscribe to a personalized recommendations feature, wherein the user's implicit preferences are quantified as an implicit rating for the user based on raw data and discovered data, and wherein the discovered data is determined based on raw data;
  a second receiver to receive the one or more personalized recommendations; and
  an output configured to display, at a display device, the one or more personalized recommendations in an electronic program guide (EPG) in response to receiving one or more user inputs to display the one or more personalized recommendations, the EPG listing programs chronologically and sequentially by channel, a first portion of the listed programs in the EPG comprising the one or more personalized recommendations along with the quantified implicit rating for the user for the one or more personalized recommendations and a second portion of the listed programs in the EPG comprising no personalized recommendations for the second portion of listed programs.

14. A method, comprising:
  receiving, by a receiver at one or more modules of a computing device, one or more user commands;
  generating, by a processor at the one or more modules, one or more personalized recommendations based on the one or more user commands, wherein generating the one or more personalized recommendations comprises taking into account the user's implicit preferences and matching one or more programs based on the one or more user commands with one or more similar programs selected by one or more other users within a community, wherein the community comprises users over multiple geographic localities who subscribe to a personalized recommendations feature, wherein the user's implicit preferences are quantified as an implicit rating for the user based on raw data and discovered data, and wherein the discovered data is determined based on raw data; and transmitting, at a transmitter at the one or more modules, the one or more personalized recommendations to be displayed at a display device in an electronic program guide (EPG) in response to receiving one or more user inputs to display the one or more personalized recommendations, the EPG listing programs chronologically and sequentially by channel, a first portion of the listed programs in the EPG comprising the one or more personalized recommendations along with the quantified implicit rating for the user for the one or more personalized recommendations and a second portion of the listed programs in the EPG comprising no personalized recommendations for the second portion of listed programs.

15. The method of claim 14, wherein generating the one or more personalized recommendations comprises matching a profile of the user with one or more profiles of similar users within the community.

16. The method of claim 14, wherein the matching is based on matching metadata content in the one or more programs with the one or more similar programs.

17. The method of claim 14, wherein the matching is based on matching ratings provided by the user for the one or more programs with ratings provided by additional users for the one or more similar programs.

18. The method of claim 14, wherein the matching is based on matching relationships provided by a third party.

19. The method of claim 14, wherein generating the one or more personalized recommendations is based on recommendations from at least one of a host service provider, a third party, and a community poll.

20. The method of claim 14, wherein generating the one or more personalized recommendations comprises matching based on at least one of a profile of the user with one or more profiles of similar users within the community and additional relationships provided by at least one of a host service provider, a third party, and a community poll.

21. The method of claim 14, wherein the one or more personalized recommendations comprise recommendations for at least one of broadcast programming, video on demand programming, pay-per-view programming, advertisements, Internet video, Internet music, and merchandise.

22. The method of claim 14, further comprising tagging at least one or more of the personalized recommendations for personalized display customization.

23. A computer readable media comprising code to perform the acts of the method of claim 14.

24. A system, comprising:
a receiver to receive and collect one or more user commands at one or more modules;
a processor to generate, at the one or more modules, one or more personalized recommendations based on the one or more user commands, wherein generating the one or more personalized recommendations comprises taking into account the user's implicit preferences and matching one or more programs based on the one or more user commands with one or more similar programs selected by one or more other users within a community, wherein the community comprises users over multiple geographic localities who subscribe to a personalized recommendations feature, wherein the user's implicit preferences are quantified as an implicit rating for the user based on raw data and discovered data, and wherein the discovered data is determined based on raw data; and
a transmitter to transmit the one or more personalized recommendations to be displayed at a display device in an electronic program guide (EPG) in response to receiving one or more user inputs to display the one or more personalized recommendations, the EPG listing programs chronologically and sequentially by channel, a first portion of the listed programs in the EPG comprising the one or more personalized recommendations along with the quantified implicit rating for the user for the one or more personalized recommendations and a second portion of the listed programs in the EPG comprising no personalized recommendations for the second portion of listed programs.

* * * * *